US006684968B2

(12) United States Patent
Bise et al.

(10) Patent No.: US 6,684,968 B2
(45) Date of Patent: Feb. 3, 2004

(54) ROOF BIT BODY AND INSERT ASSEMBLY

(75) Inventors: Douglas E. Bise, Chilhowie, VA (US); Phillip W. Haga, Chilhowie, VA (US); Ted R. Massa, Latrobe, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 09/888,770

(22) Filed: Jun. 25, 2001

(65) Prior Publication Data

US 2002/0195280 A1 Dec. 26, 2002

(51) Int. Cl.$^7$ .............................................. E21B 10/46
(52) U.S. Cl. ..................... 175/427; 175/420.1; 175/430; 175/432
(58) Field of Search ................................. 175/414, 416, 175/420.1, 420.2, 427, 430, 432, 396, 435

(56) References Cited

U.S. PATENT DOCUMENTS

| | | | |
|---|---|---|---|
| 3,049,033 A | 8/1962 | Benjamin et al. | |
| 4,356,873 A | 11/1982 | Dziak | 175/420.1 |
| 4,595,322 A | 6/1986 | Clement | 408/230 |
| 4,633,959 A | 1/1987 | Knox | 175/420.1 |
| 4,787,464 A | 11/1988 | Ojanen | 175/57 |
| 4,817,742 A | 4/1989 | Whysong | 175/420.1 |
| 4,817,743 A | 4/1989 | Greenfield et al. | 175/435 |
| 5,172,775 A | 12/1992 | Sheirer et al. | 175/57 |
| 5,184,689 A | 2/1993 | Sheirer et al. | 175/420.1 |
| 5,184,925 A | 2/1993 | Woods et al. | 408/144 |
| 5,220,967 A | 6/1993 | Monyak | 175/420.1 |
| 5,226,489 A | 7/1993 | Woods et al. | 175/420.1 |
| 5,310,015 A | 5/1994 | Woods et al. | 175/420.1 |
| 5,429,199 A | 7/1995 | Sheirer et al. | 175/321 |
| 5,458,210 A | 10/1995 | Sollami | 175/420.1 |
| 5,467,837 A | 11/1995 | Miller et al. | 175/420.1 |
| 5,829,540 A | 11/1998 | Peay et al. | 175/420.1 |
| 6,026,918 A | * 2/2000 | Briese | 175/414 |

FOREIGN PATENT DOCUMENTS

EP 353214 A2 * 1/1990

* cited by examiner

Primary Examiner—Zakiya Walker
(74) Attorney, Agent, or Firm—Kevin P. Weldon

(57) ABSTRACT

A center vacuum rotary drill bit including a rotary drill bit body and an insert. The bottom surface of the slot has a projecting key that cooperates with a depression keyway of the insert. Generally vertical sidewall surfaces of a depression keyway and vertical surfaces of a projection key provide mechanical resistance against lateral movement of the cutting insert. This mechanical resistance reduces displacement of the insert with respect to the bit body during brazing and thus a high quality, accurately aligned drill bit assembly is provided by applicants' invention. The depression keyway is designed so as to minimize the effect of the axial load on the insert by avoiding sharp corners which tend to amplify nominal stress and provides an insert of a proper carbide density after pressing. Integral bit body protuberances adequately separate the insert within the slot and permit braze flow between the insert and slot. The protuberances enhance braze flow when braze is fed between the insert body and bit body.

15 Claims, 4 Drawing Sheets

ROOF BIT BODY AND INSERT ASSEMBLY

RELATED APPLICATIONS

This application is related to copending U.S. patent application Ser. No. 09/376,725, filed Aug. 17, 1999, to Ted R. Massa et al. (Case No. K-1313D), now U.S. Pat. No. 6,260,638, entitled "ROTATABLE CUTTING BIT ASEMBLY WITH WEDGE LOCK RETENTION ASSEMBLY."

FIELD OF THE INVENTION

This invention relates to a roof bit assembly. More particularly, this invention relates to a roof bit insert assembly for securely connecting an insert onto a bit body.

BACKGROUND OF THE INVENTION

Roof bits are used in a violent environment in which heavy loads and torques are continually applied to the roof bits at a high rate. One inch diameter roof bits are commonly operated at about 250–600 rpm and 1000–8000 pounds thrust. These conditions also generate excessive heat at the tip end of the roof bit assembly.

A hard wear resistant insert for use in a center vacuum rotary drill bit is typically formed of cemented tungsten carbide and is secured by brazing the insert within a slot formed within a top working surface of the body of the rotary drill bit. The hard wear resistant insert secured within the top working surface of the rotary drill bit body typically wears or dulls before the drill bit body becomes worn and unusable such that the user of the center vacuum rotary drill bit must either replace the entire rotary drill bit, attempt to replace the insert with a new insert of similar size, or attempt to resharpen the insert. Replacement of the entire center vacuum rotary drill bit is costly and resharpening of the insert may only be performed a limited number of times before the top working surface of the drill bit body frictionally engages the material to be cut.

In U.S. Pat. Nos. 5,310,015; 5,184,925 and 5,226,489, to Woods et al., a roof bit assembly is disclosed wherein a support bar is positioned between the insert bit and bit body for adjusting the height that the insert bit extends beyond the top surface of the roof bit body. In U.S. Pat. No. 5,184,925, the insert body has a semicircular notch 50 therein and the support bar has a corresponding convex portion for cooperating with the depression. The support bar in these roof bits results in additional assembly time during original manufacturing or when replacing inserts onto a bit body. The assembly of these roof bits can be even more time consuming and cumbersome in the field. The support bar also requires maintaining additional parts and undesirable expanding inventories.

In U.S. Pat. No. 4,356,873, to Dziak, an insert is provided with a notch that cooperates with a projection 38 on a retainer clip that must be fixed into a slot of the bit body. The retainer clip is laterally held in position in the bit body slot by flanges 40 that cooperate with the exterior cylindrical wall of the bit body.

There is a need in the industry for a mining roof bit that requires a minimum number of parts, is easy to assemble accurately, braze, and comparatively inexpensive in cost. There is also a need in the industry for an insert that is securely held in the bit body during drilling operations and is not as readily knocked loose from the bit body.

SUMMARY OF THE INVENTION

Briefly, according to this invention there is provided a center vacuum rotary drill bit including a rotary drill bit body and an insert. The rotary drill bit body includes a top working surface having a slot extending transversely across the top working surface. The slot includes a first sidewall, an opposite second sidewall and a bottom surface extending between the first sidewall and the second sidewall. The insert includes a pair of oppositely facing generally parallel side surfaces, a pair of oppositely facing end surfaces extending between and interconnecting the side surfaces, a pair of oppositely inclined top surfaces extending between and interconnecting the side and end surfaces, and a bottom surface extending transversely to and interconnecting the side and end surfaces. The bottom surface of the slot has a projecting key that cooperates with a depression keyway of the insert.

In one embodiment, generally vertical sidewall surfaces of a depression keyway and vertical sidewall surfaces of a projection key provide mechanical resistance against lateral movement of the cutting insert. This mechanical resistance reduces displacement of the insert with respect to the bit body during brazing and thus a high quality, accurately aligned drill bit assembly is provided by applicants' invention. Additionally, it is believed that during drilling operations the vertical surfaces assist in resisting lateral displacement caused by lateral force loads and torques applied to the cutting ends of the insert.

The depression keyway is designed so as to minimize the effect of the axial load on the insert by avoiding sharp corners which tend to amplify nominal stress and provides for an insert of a proper carbide density after pressing.

Integral bit body protuberance means contact the insert along the slot, the protuberance means are cylindrical ridges, semispherical, circular, prisms, angular or an equivalent shape or form. The protuberance means adequately separate the insert within the slot and permit braze flow between the insert and slot. The protuberance means enhance braze flow when braze is fed between the insert body and bit body.

The overall bottom surface area of the cemented tungsten carbide insert is significantly increased by the keyway depression. The key and keyway increase the surface contact area between the bottom surface area of the insert and cooperating bottom surface of the slot. The increased surface contact area allows for additional braze to be applied between the insert and bit body slot enhancing the strength of the bond between the insert and bit body.

Another added benefit of the depression keyway is that the depression keyway in the tungsten carbide reduces the amount of tungsten carbide or other material needed to manufacture the insert. In comparison to an insert bit dimensionally equivalent in shape and size to applicants' insert without a keyway, 30%–50% by weight less tungsten is needed to make applicant's insert bit. Cemented tungsten carbide is relatively expensive and applicants, insert design significantly reduces material costs.

The invention requires a minimum number parts for assembly, reduces material cost and provides for a strong and precisely assembled roof bit.

BRIEF DESCRIPTION OF THE DRAWINGS

Further features and other aspects and advantages of this invention will become clear from the following detailed description made with reference to the drawings in which.

DESCRIPTION OF THE PREFERRED EMBODIMENT

Figure 1:
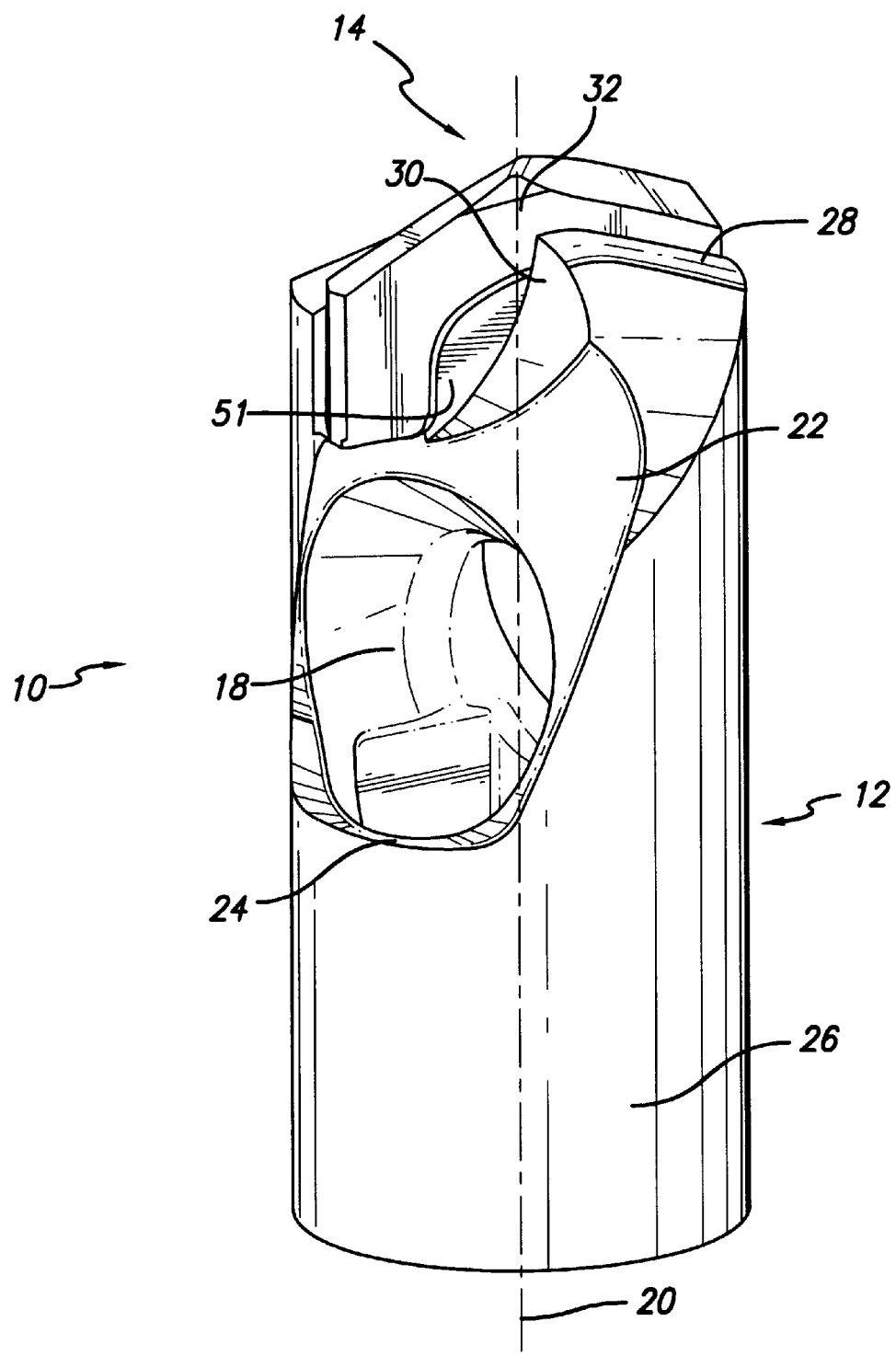
FIG. 1 is a perspective view of a center vacuum rotary drill bit including an insert and bit body in accordance with the present invention.

In the following description, like reference characters designate like or corresponding parts. Referring now to FIG. 1, there is shown a center vacuum rotary drill bit assembly 10 including an elongated cylindrical bit body 12 having a generally cylindrical section 26 and a top working surface 14.

The bit body 12 includes at least a pair of opposing dust collection openings 18 angularly positioned with respect to a central vertical axis 20 of the drill bit body. The dust collection openings 18 are disposed within recessed surfaces 22. As shown in FIG. 1, the openings 18 and recessed surfaces 22 cooperatively provide a pair of oppositely disposed, generally transverse, arcuate shaped shoulder portions 24.

The top working surface 14 of the drill bit body 12 has an irregular surface configuration defined by an alternating first pair of oppositely disposed trailing surfaces 28 and a second pair of oppositely disposed tapered compression surfaces 30. The trailing surfaces 28 are generally parallel to the top surface of the insert and extend downwardly and outwardly in a direction away from the vertical central axis 20 of the drill bit body 12 and provide a backup or support for an insert 32. The tapered compression surfaces 30 are of a generally semicircular shape. The lower edge of each of the compression surfaces 30 abuts with the recessed surface 22, which together cooperatively act as a conduit for dust and the like to flow to the openings 18.

As a own in FIGS. 1–4, the drill bit body defines a transversely extending slot to receive an insert 32. The slot includes a first sidewall 36 and an opposite second sidewall 38 joined at the bottom edge thereof by slot bottom surface comprising two bottom surface sections 40 connected by a generally central projection key 51. Preferably, the sidewalls 36 and 38 of the slot are parallel to the vertical central axis 20 of the drill bit body 12. The generally centrally positioned inverted U-shape projection 51 functions as a key and support member The bit body is cast from steel. Suitable steels for manufacturing the bit body would be either 4140 and 15B35 A.I.S.I (American Iron & Steel Institute). Other suitable steel compositions are disclosed in U.S. Pat. Nos. 5,008,073 and 4,886,710, both to Greenfield.

The insert 32 secured within the slot may be of a type having a plate-like configuration and made of a high strength, wear-resistant material such as cemented tungsten carbide and the like. The insert is typically made from a hard material such a tungsten carbide-cobalt alloy. Exemplary materials for the hard inserts include cobalt cemented tungsten carbide grades such as a Grade 1 that contains 5.4 weight percent cobalt (the balance tungsten carbide), a tungsten carbide grain size of 1-18 (micrometers), and a Rockwell A hardness of 88.2; a Grade 2 that contains 6.3 weight percent cobalt with the balance being tungsten carbide; a tungsten grain size of 1–12 micrometers, and a Rockwell A hardness of 89.6; and a Grade 3 that contains 6.0 weight percent cobalt (the balance being tungsten carbide), a tungsten carbide grain size of 1–9 micrometers, and a Rockwell A hardness equal to 90.7. While the above three grades are acceptable grades of cemented tungsten carbide, the preferred grade of cemented tungsten carbide for the hard inserts is *Kennametal Grade K3012E:*

Figure 4:
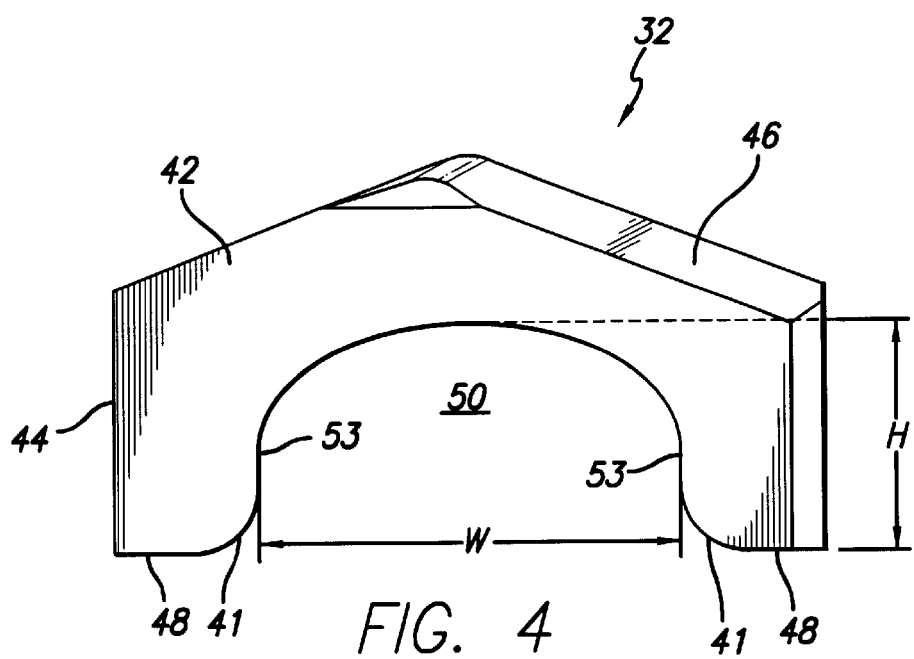
FIG. 4 is a side view of the insert bit used in FIG. 1.

As shown in FIG. 4, the insert 32 is an "A" frame house style tungsten carbide insert having a pair of oppositely facing, generally parallel side surfaces 42 and a pair of oppositely facing end surfaces 44. A pair of adjacent oppositely inclined top surfaces 46 extend between and interconnect the side 42 and end 44 pairs of surfaces. Two bottom surfaces 48 are separated by an inverted U-shaped depression 50 that functions as a keyway for receiving the U-shaped projection key 51. The insert bottom surfaces 48 are generally rectangular shape and are sized relative to the bit body slot to fit within the slot in closely spaced relation to the corresponding inner side walls 36 and 38 and bottom surfaces 40 of the slot.

The keyway 50 in the tungsten carbide reduces the amount of tungsten carbide or other hard material needed to manufacture the insert. For instance, in comparison to an insert bit dimensionally equivalent in size to applicants' insert that does not have a keyway or any other notches thereinbetween, 30%–50% by weight less tungsten is needed to make applicants' insert bit. Cemented tungsten carbide is significantly more expensive per pound than the cost of steel used to construct the additional bit body key 51 that is needed to provide support within the inverted U-shaped arch.

The U-shaped depression does not include any sharp edges and has a smooth contour allowing for more uniform compaction during manufacturing. In pressing cemented tungsten carbide drill bit inserts, sharp edges of irregular, angular rough dyes result in nonuniform compaction and density of the cemented tungsten carbide material. The nonuniform density of cemented tungsten carbide results in material weakness adjacent the sharp angular surfaces that is more susceptible to fracture. The bottom surfaces 48 adjacent the U-shape depression are rounded at the corners 41 to also insure more uniform carbide density at the corners. The corners 41 have a radius of between 0.03–0.18 inches. Similarly, the apex of the bit insert where the two top inclined surfaces 46 meet can also be rounded for the same purpose.

Another benefit of having a U-shaped keyway 50 and projection key 51 is that the generally vertical sidewall surface sections 53 of the keyway and vertical surface sections 55 of the projection key provide mechanical resistance against radially outward movement of the cutting insert. This mechanical resistance reduces dislocation of the insert with respect to the bit body during assembly prior to brazing, during brazing and it is believed during operational use of the roof bit. The height of the vertical surface 53 is of sufficient height to ensure that when the insert is positioned in the slot more than just a minimal amount of axial displacement must occur before the contacting vertical surfaces of the insert 53 and projection key 55 are axially displaced so as to disengage. The height of the vertical surface 53 of the key extends generally between 0.04–0.10 inches. When assembling the insert and bit body together the cooperating key and keyway enable the insert to be quickly and accurately positioned without the necessity of manually measuring and aligning the insert into its proper position on the bit body. The cooperating key and keyway also substantially help interlock the insert to the bit body reducing the likelihood of separation failure in the field. Copending U.S.

patent application Ser. No. 09/376,725, filed Aug. 17, 1999, to Ted R. Massa et al. (Case No. K-1313D), now U.S. Pat. No. 6,260,638, entitled "ROTATABLE CUTTING BIT ASEMBLY WITH WEDGE LOCK RETENTION ASSEMBLY" is herein incorporated by reference. Additionally, the contact surface area is significantly increased between the cooperating projection and depression surfaces which provides the added benefit of increased surface area for applying braze and improving the bond between the insert and bit body. Hence, the cooperating projection key and keyway depression enhance the connection between the insert and bit body by improving both physical resistance and the braze joint.

It is believed that an inverted U-shape concave depression 50 better distributes an applied axial force during cutting or drilling by the bit 10 thereby preventing fracture of the insert 32. It will be appreciated that the design of the concave U-shaped depression 50 similar to a semicircular depression minimizes the effect of the axial load on the insert 32 during use by eliminating sharp corners that amplify nominal stress.

As shown in FIGS. 1–4, the concave depression 50 is an inverted U-shape having a central axis perpendicular to the parallel side surfaces 42 of the insert. In another embodiment, the central axis of the concave depression 50 may be positioned at an oblique angle with respect to the parallel side surfaces 42 of the insert.

Figure 2:
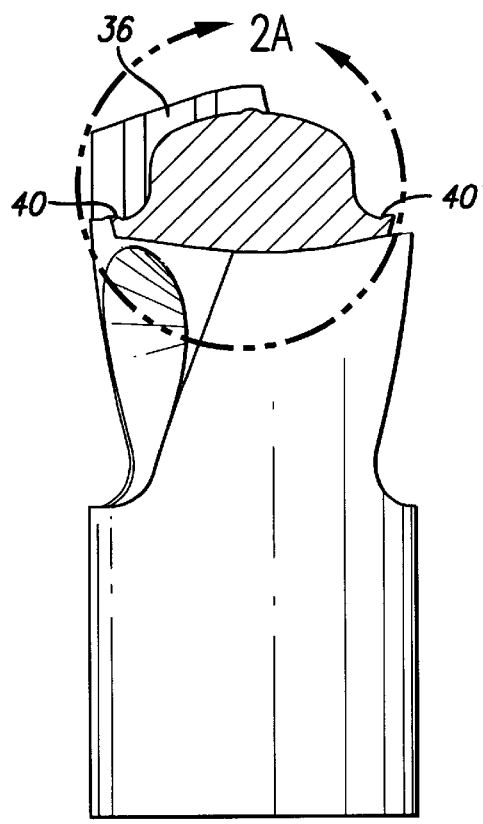
FIG. 2 is a side view of FIG. 1 with a partial cross-section.
Figure 2A:
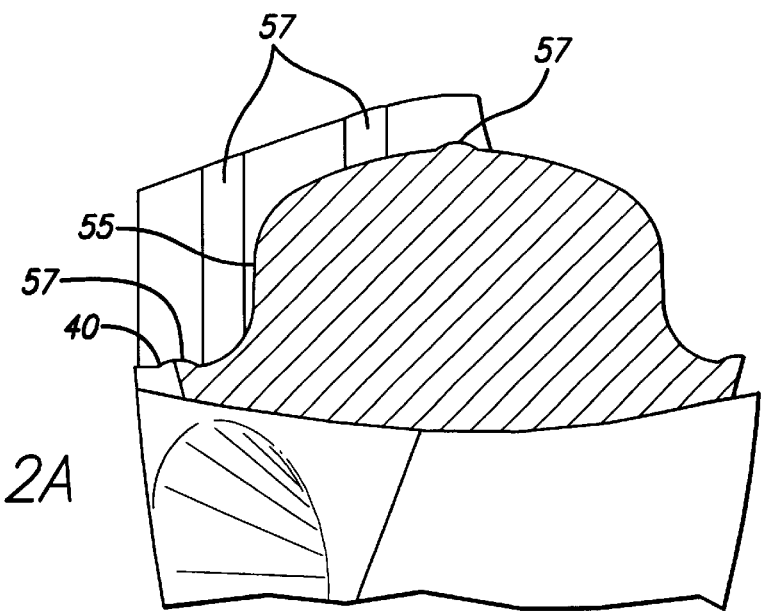
FIG. 2A is an enlarged side view and cross-section of the slot of FIG. 2.
Figure 3:
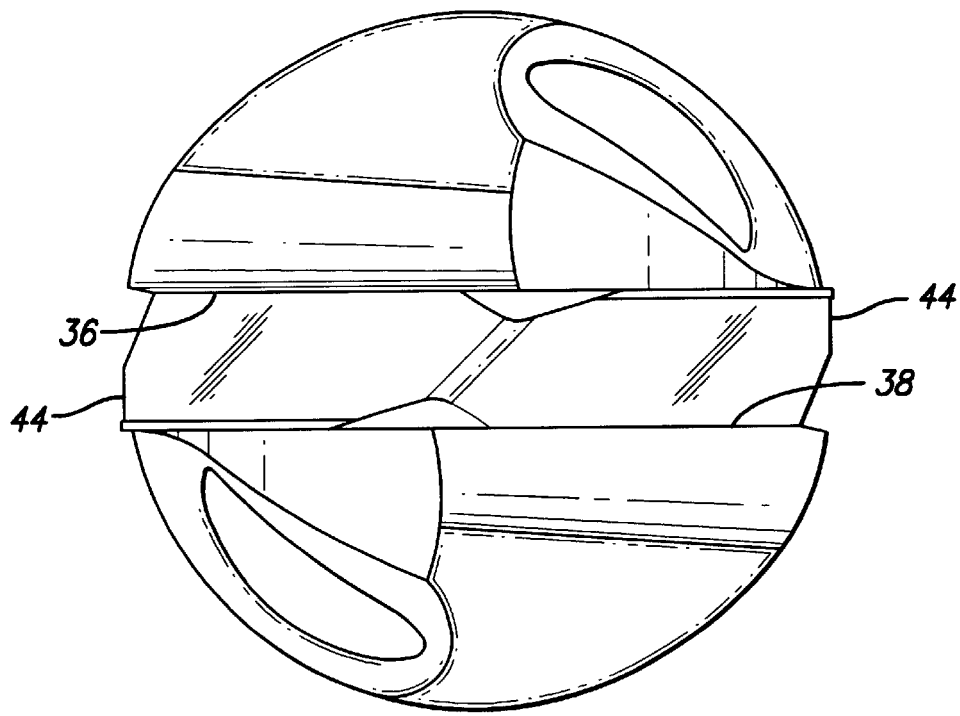
FIG. 3 is a top view of the roof bit shown in FIG. 1.

As illustrated in FIG. 2A, the bit body slot has protuberance means shaped as integral ridges 57 along the bottom surface sections 40, on the top of the key 51 and on both sidewall surfaces 36 and 38 of the slot. The ridges 57 are for the intended purpose of providing gaps for braze material to flow and penetrate between and around the insert and slot. The braze can be wire fed between the insert body and bit body. A suitable braze alloy is HANDY HI-TEMP 548 braze alloy, manufactured and sold by Handy & Harmon, Inc., 859 Third Avenue, New York, N.Y. 10022. HANDY HI-TEMP 548 braze alloy is composed of 55+/–1.0 weight percent copper, 6+/–0.5 weight percent nickel, 4+/–0.5 weight percent manganese, 0.5+/–0.05 weight percent silicon, and the balance zinc with 0.50 weight percent maximum on total impurities. Additional information on HANDY HI-TEMP 548 braze alloy may be found in Handy & Harmon Technical Data Sheet D-74, available from Handy & Harmon, Inc.

Alternatively, the insert can be brazed to the bit body by employing a braze material shaped to correspond to the shape of the insert including a keyway. The braze material and insert are positioned into the bit body slot and heated together in combination to melt the braze that bonds the insert to the bit body.

The large U-shaped key central to the insert bit improves heat transfer away from the tip end of the bit body during drilling in comparison to prior art roof bits without a key and cooperating keyway. The bit body steel has a higher heat transfer conduction rate than the hard material (e.g., tungsten carbide) of the insert bit. Hence, on account of lower operating temperatures, it is believed that lower temperature braze alloys than HANDY HI-TEMP 548 can be used. A lower temperature brazing operation helps reduce the energy costs in manufacturing the roof bit assembly.

Figure 5:
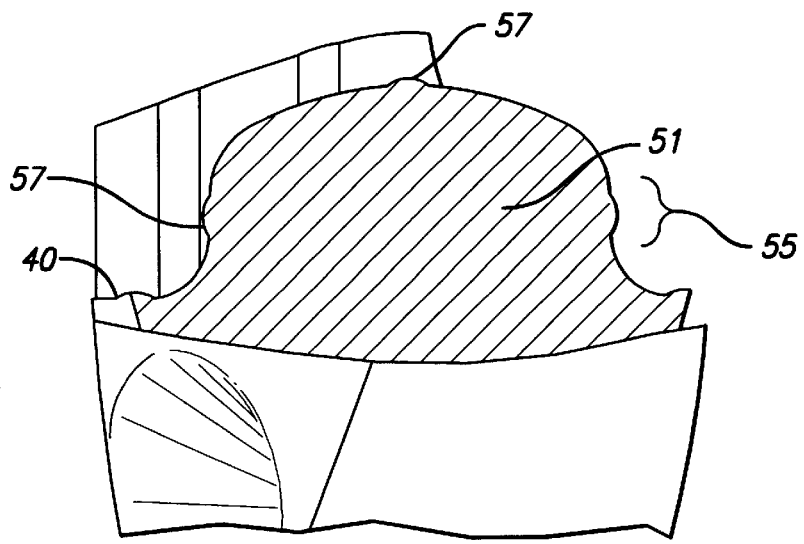
FIG. 5 is a partial cross-sectional side view of a second embodiment.
Figure 6:
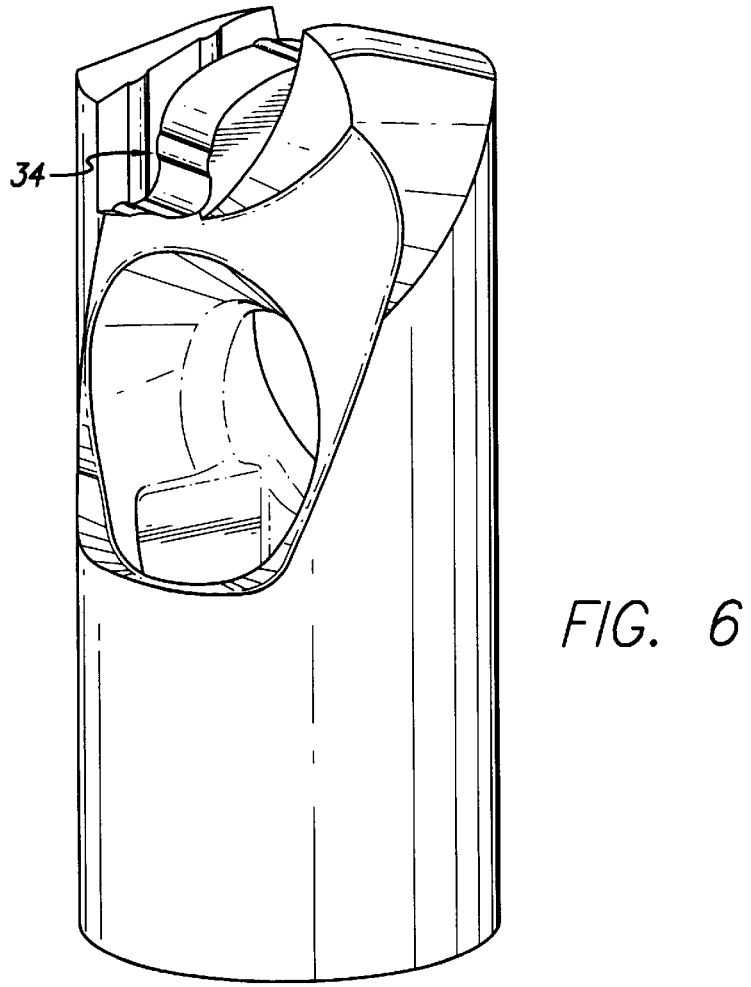
FIG. 6 is a perspective view of the bit body of the second embodiment illustrated in FIG. 5.

In a second embodiment illustrated in FIGS. 5–6, in addition to the protuberance along the bottom surface sections 40 of the slot 34 on top of the key 51 and on both sidewall surfaces 36 and 38 as in the first embodiment, protuberance means are positioned on the vertical surface sections 55 of the projection key 51. The protuberance means on these vertical sections 51 allow for additional braze to flow into and fill a resulting gap between the insert and bit body.

In other embodiments, the protuberance means that contact the insert along the slot can be semispherical, circular, prisms or other shapes that adequately separate the insert within the slot and permit braze flow between and about the insert and slot.

In FIG. 4, the width W and height H of the concave depression 50 corresponds to the bit body key 51 shape and size, the height H and width W of the depression keyway can be varied in accordance with the hardness of the insert material, the hardness of the material being drilled and the overall width/height of the insert. For example, an insert of approximately 1 inch diameter may have a keyway width of approximately 0.60 inches and height H of approximately 0.310 inches with the overall height of the insert from bottom to peak of the top surface being approximately 0.50 inches. On the other hand an insert having an overall width of approximately 1½ inch diameter may have a depression keyway width of approximately 0.90 inches. The height H and width W dimensions for the keyway depression and slot projection key are designed not to significantly compromise the performance, strength, fracture resistance and useful life of the insert in relation to prior art inserts of similar dimensions without a keyway.

Although the invention was primarily developed in connection with a center vacuum rotary drill bit, and is thus described with respect thereto, it will be readily apparent that applicants' improved insert spacer assembly may be used with equal facility for other tools such as rotary drill bits and the like. Accordingly, the description of the invention in relation to a center vacuum rotary drill bit is not to be construed as a limitation on the scope of the invention.

The documents, patents and patent applications referred to herein are hereby incorporated by reference.

Having described presently preferred embodiments of the invention, it is to be understood that it may be otherwise embodied within the scope of the appended claims.

What is claimed is:

1. A rotary drill bit assembly comprising:
   a rotary drill bit body having a top working surface and a slot extending transversely across said top working surface, said slot including a first sidewall, an opposite second sidewall and a first bottom surface extending between said first sidewall and said second sidewall;
   an insert positioned within said slot, said insert including a second bottom surface having a U-shaped depression formed therein, said first bottom surface having a U-shaped projection such that said projection supports said depression,
   wherein the U-shaped depression forms a void that makes said insert approximately between 30%–50% by weight less than an insert of equal dimension without a depression therein.

2. The rotary drill bit assembly according to claim 1 wherein said slot has plurality of protuberance means for enhancing brazing.

3. The rotary drill bit assembly according to claim 2 wherein the insert is connected to said bit body by brazing.

4. The rotary drill bit assembly according to claim 1 wherein said U-shaped depression is smooth and does not include any sharp corners.

5. A rotary drill bit assembly comprising:
   a rotary drill bit body having a top working surface and a slot extending transversely across said top working surface, said slot including a first sidewall, and opposite second sidewall and a first bottom surface extending between said first sidewall and said second sidewall;

an insert positioned within said slot, said insert including a second bottom surface having a U-shaped depression formed therein, said first bottom surface having a U-shaped projection such that said projection supports said depression wherein a vertical surface portion of said U-shaped projection provides mechanical resistance to displacement of said insert from said slot.

6. A rotary drill bit assembly comprising;

a rotary drill bit body having a top working surface and a slot extending transversely across said top working surface, said slot including a first sidewall, and opposite second sidewall and a first bottom surface extending between said first sidewall and said second sidewall;

an insert positioned within said slot, said insert including a second bottom surface having a U-shaped depression formed therein, said first bottom surface having a U-shaped projection such that said projection supports said depression wherein said U-shaped projection in said slot has protuberance means for enhancing brazing.

7. A rotary drill bit assembly comprising:

a rotary drill bit body having a top working surface and a slot extending transversely across said top working surface, said slot including a first sidewall, an opposite second sidewall and a first bottom surface extending between said first sidewall and said second sidewall;

an insert positioned within said slot, said insert including a second bottom surface having a U-shaped depression formed therein, said first bottom surface having a U-shaped projection such that said projection supports said depression, said first and second sidewalis have a plurality of protuberance means for enhancing brazing.

8. A bit body comprising:

a slot wherein said slot includes a U-shaped projection, wherein said U-shaped projection has a plurality of protuberance means for enhancing brazing.

9. The bit body according to claim 8 further comprising:

a cylindrical section; and a top working surface.

10. The bit body according to claim 9 wherein said top working surface includes a pair of trailing surfaces and compression surfaces.

11. The bit body according to claim 8 wherein the protuberance means are ridges.

12. The bit body of claim 8 wherein said bit body includes a generally cylindrical section having dust collection openings therein.

13. A bit body comprising:

a slot wherein said slot includes a U-shaped projection having a plurality of protuberance means for enhancing brazing.

14. A bit body comprising:

a top working surface and a slot extending transversely across said top working surface, said slot including a first sidewall, an opposite second sidewall and a first bottom surface extending between said first sidewall and said second sidewall;

wherein said slot first and second sidewalls have a plurality of protuberance means for enhancing brazing.

15. A rotary drill bit assembly comprising:

a rotary drill bit body having a top working surface a slot extending transversely across said top working surface, said slot including a first sidewall, an opposite second sidewall and a first bottom surface extending between said first sidewall and said second sidewall;

an insert positioned within said slot, said insert including a second bottom surface having a U-shaped depression formed therein, wherein the U-shaped depression forms a void that makes said insert approximately between 30%–50% by weight less than an insert of equal dimension without a depression therein.

* * * * *